UNITED STATES PATENT OFFICE.

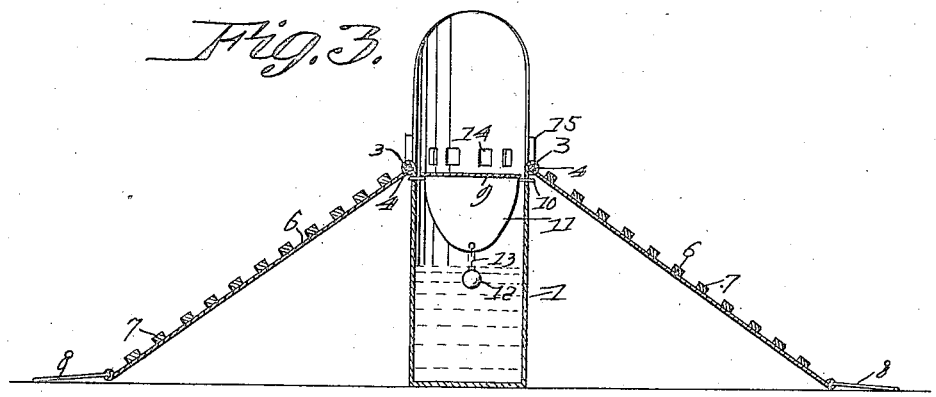
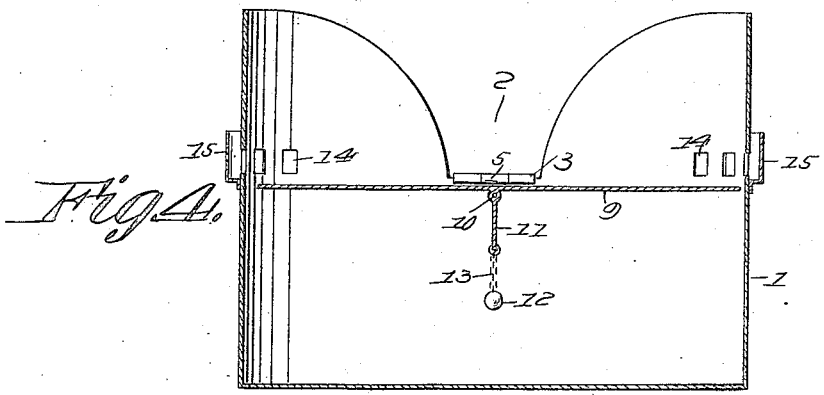
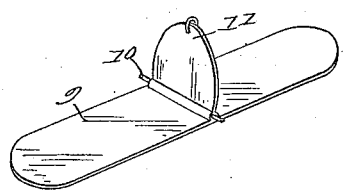

PEDRO ORBE, OF CARLIN, NEVADA.

RAT TRAP.

1,419,299.          Specification of Letters Patent.    Patented June 13, 1922.

Application filed September 3, 1920. Serial No 407,939.

*To all whom it may concern:*

Be it known that I, PEDRO ORBE, a citizen of the United States of America, residing at Carlin, in the county of Elko and State of Nevada, have invented new and useful Improvements in Rat Traps, of which the following is a specification.

The object of the invention is to provide a comparatively simple and inexpensive device of the kind described, wherein the same is provided with means which, when the device is in operative position will serve as ways by which animals may enter the enclosure, and which may serve as carrying means during the time of transportation of the device.

The invention is illustrated and described in a specific embodiment to which, however, it is not to be restricted. The right is reserved to make such changes or alterations as the actual reduction to practice may suggest, insofar as such changes or alterations are compatible in spirit with the annexed claims.

In the accompanying drawings:—

Figure 3, is a transverse section on the line 3—3 of Figure 2.

Figure 4, is a longitudinal section on the line 4—4 of Figure 2.

Figure 5, is a perspective view of the swinging platform constituting the entrapping element of the invention, the same being inverted in this figure.

Figure 1:
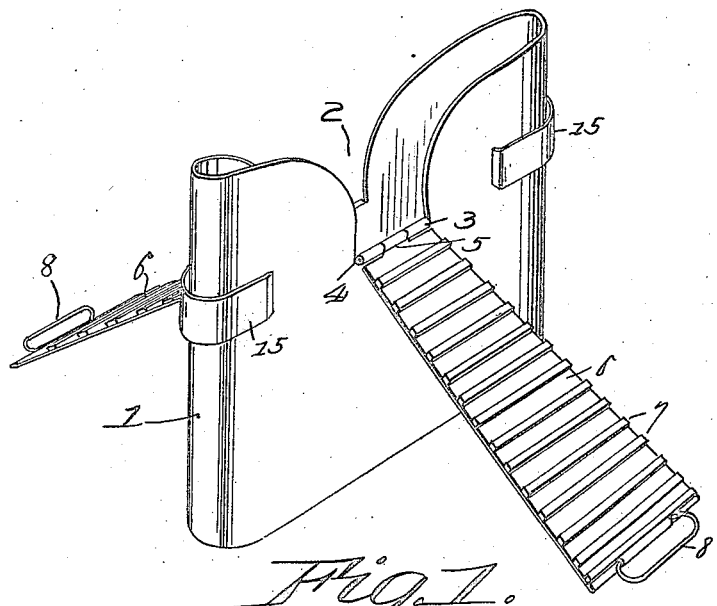
Figure 1, is a perspective view of the invention.
Figure 2:
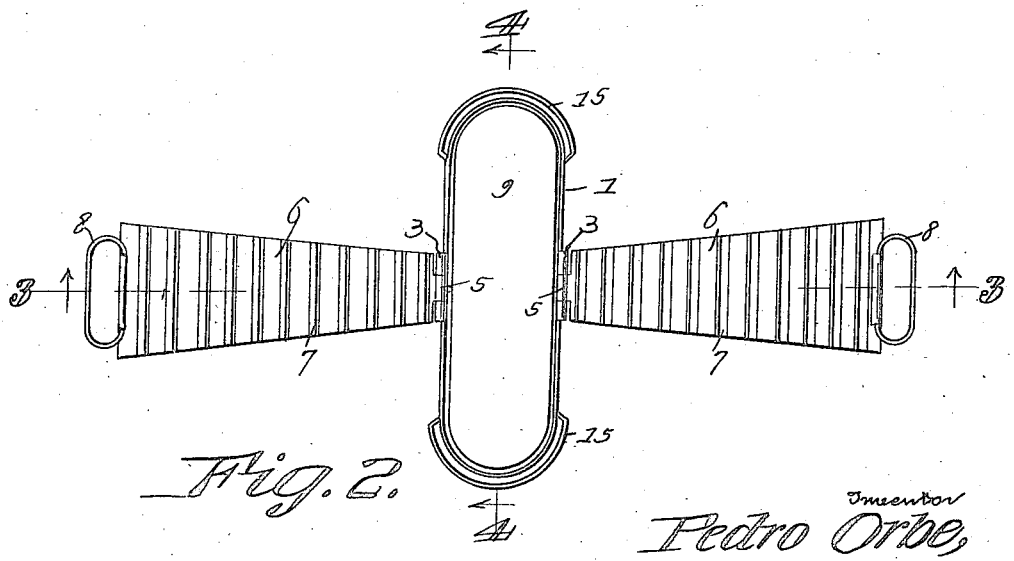
Figure 2, is a top plan view.

The invention comprises a substantially oval-shaped housing 1, the upper edge of which is open and the side walls of which are cut away as indicated at 2. Where the side walls are cut away they are coiled as indicated at 3 and these coils or eyes receive the pintles 4 and the two coils being spaced apart to receive between them a small coil 5 which embraces the pintle and which is formed at the extremity of an inclined way 6 provided with transverse tread sticks 7 to enable an animal to easily ascend the way. At the lower extremity a handle 8 is provided. The ways may be swung to the diagonal position indicated in Figures 3 and 1 when the case is disposed on the floor or on a table or they may be raised into substantial alignment with the side walls of the case when the two handles 8 on the two ways serve as carrying elements for the device as a whole.

A swinging plate 9 is provided and this plate is of substantially the same dimensions as the bottom of the casing but of course, slightly smaller than the latter to permit its swinging free in the casing, such swinging movement being provided through the instrumentality of a pintle 10 transversely disposed at substantially the vertical center of the plate 9. The latter is formed with a depending sector plate 11 about the lower edge of which there is carried a weight 12 attached to the plate by means of a chain 13. Obviously the weight together with the plate 11 serves to maintain the plate 9 in a substantially horizontal position.

At the ends of the housing, there are formed the perforations 14 and attached on the outside of the housing there are pockets or bait receiving receptacles 15 which cover the perforations 14 and which are adapted for the reception of cheese or other bait to entice animals into the trap.

It is the purpose to fill the bottom of the housing or entrapping receptacle with water and when the trap is set the two ways are thrown down into the diagonal positions indicated, the two receptacles 15 being provided with the desired kind of bait. Animals to be entrapped smelling the bait will find their way up the ways 6 and seeking to pass to the ends of the casing near the perforations will do so by stepping on the plate or shifting platform 9 which will yield to their weight and thus cause them to be cast into the water beneath.

When not in use and to be transported from one point to another, the ways may be folded up as before stated, the handles 8 serving as a carrying means by which the whole may be readily carried.

The invention having been described, what is claimed as new and useful is:—

1. A rat trap comprising a housing, the sides of which are cut away and provided with coils for the reception of pintles, ways having their upper extremities embracing the pintles, and handles at the ends of the ways whereby the latter may be raised to serve as carrying means for the casing or extended to diagonal positions as means for entrance into the casing.

2. A trap comprising a casing cut away on opposite sides to provide entrance recesses to the casing, ways having their extremities pivoted to the casing adjacent the said entrance recesses, and handles carried by the ways whereby the latter may be inclined to provide entrance means to the entrance recesses or elevated to folded position to provide carrying means for the casing.

In testimony whereof I affix my signature.

PEDRO ORBE.